(12) United States Patent
Anderson et al.

(10) Patent No.: US 6,919,004 B2
(45) Date of Patent: Jul. 19, 2005

(54) CATHODIC ELECTROCOATING COMPOSITION CONTAINING A MORPHOLINE DIONE CROSSLINKING AGENT

(75) Inventors: Albert G. Anderson, Wilmington, DE (US); Allisa Gam, Troy, MI (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 416 days.

(21) Appl. No.: 10/187,543

(22) Filed: Jul. 2, 2002

(65) Prior Publication Data

US 2004/0003996 A1 Jan. 8, 2004

(51) Int. Cl.⁷ ............................................. C25D 13/10
(52) U.S. Cl. .................... 204/506; 204/505; 523/415
(58) Field of Search ................................ 204/506, 505; 523/415

(56) References Cited

U.S. PATENT DOCUMENTS

| | | |
|---|---|---|
| 4,369,290 A | 1/1983 | Evans et al. |
| 4,416,753 A | 11/1983 | Batzill et al. |
| 4,542,202 A | 9/1985 | Takeuchi et al. |
| 4,615,779 A | 10/1986 | McCollum et al. |
| 4,684,702 A | 8/1987 | Paar et al. |
| 4,719,253 A | 1/1988 | Turpin et al. |
| 4,931,501 A | 6/1990 | Lai et al. |
| 5,431,791 A | 7/1995 | December et al. |
| 5,510,400 A * | 4/1996 | Kageyama et al. ......... 523/404 |

FOREIGN PATENT DOCUMENTS

| | | |
|---|---|---|
| EP | 0371640 A1 | 6/1990 |
| EP | 0491462 A | 6/1992 |
| TW | 216804 | 8/1992 |

OTHER PUBLICATIONS

International Search Report (PCT/US 03/20895) dated Nov. 25, 2003.

* cited by examiner

*Primary Examiner*—Kishor Mayekar
(74) *Attorney, Agent, or Firm*—Steven C. Benjamin

(57) ABSTRACT

An improved aqueous cathodic electrocoating composition having a binder of an epoxy-amine adduct and a crosslinking agent; wherein the improvement is the use of a crosslinking agent having at least one, preferably a plurality of morpholine dione groups per molecule. Electrodeposited finishes are formed that have reduced volatile emissions and film weight loss when heated to cure.

14 Claims, No Drawings

CATHODIC ELECTROCOATING COMPOSITION CONTAINING A MORPHOLINE DIONE CROSSLINKING AGENT

BACKGROUND OF THE INVENTION

This invention is directed to a cathodic electrocoating composition and in particular to a cathodic electrocoating composition containing a morpholine dione crosslinking agent which significantly reduces volatile emissions and bake-off loss that occur from the coating film during curing.

The coating of electrically conductive substrates by an electrodeposition process, also called an electrocoating process, is a well known and important industrial process. Electrodeposition of primers on metal automotive substrates is widely used in the automotive industry. In this process, a conductive article, such as an autobody or an auto part, is immersed in a bath of a coating composition of an aqueous emulsion of film forming polymer and the article acts as an electrode in the electrodeposition process. An electric current is passed between the article and a counter-electrode in electrical contact with the coating composition until a coating of a desired thickness is deposited on the article. In a cathodic electrocoating process, the article to be coated is the cathode and the counter-electrode is the anode.

Film forming resin compositions used in the bath of a typical cathodic electrodeposition process also are well known in the art. These resins typically are made from polyepoxide resins which have been chain extended and then an adduct is formed to include amine groups in the resin. Amine groups typically are introduced through a reaction of the resin with an amine compound. These resins are blended with a crosslinking agent, usually a polyisocyanate, and then neutralized with an acid to form a water emulsion which is usually referred to as a principal emulsion.

The principal emulsion is combined with a pigment paste, coalescent solvents, water, and other additives such as a catalyst to form the electrocoating bath. The electrocoating bath is placed in an insulated tank containing the anode. The article to be coated is the cathode and is passed through the tank containing the electrodeposition bath. The thickness of the coating that is deposited on the article being electrocoated is a function of the bath characteristics, the electrical operating characteristics of the tank, the immersion time, and the like.

The resulting coated article is removed from the bath and is rinsed with deionized water. The coating on the article is cured typically in an oven at sufficient temperature to form a crosslinked finish on the article. The presence of the catalyst enhances the crosslinking of the finish. Cathodic electrocoating compositions, resin compositions, coating baths and cathodic electrodeposition processes are disclosed in Jarabek, et al. U.S. Pat. No. 3,922,253 issued Nov. 25, 1975; Wismer, et al. U.S. Pat. No. 4,419,467 issued Dec. 6, 1983; Belanger U.S. Pat. No. 4,137,140 issued Jan. 30, 1979 and Wismer, et al. U.S. Pat. No. 4,468,307 issued Aug. 25, 1984.

One disadvantage associated with conventional electrocoating compositions containing polyisocyanate crosslinking agents is that in order to prevent premature gelation of the electrocoating composition, the highly reactive isocyanate groups on the curing agent must be blocked, for example, with an alcohol. Blocked polyisocyanates, however, require high temperatures to unblock and begin the curing reaction. This curing mechanism also releases a substantial amount of volatile blocking agents during curing, which generates unwanted film weight losses, also known as bake-off loss, and makes it necessary to purify the exhaust air discharged from the oven and constitutes an unwanted loss in resin solids. In addition, the volatile blocking agents released during cure can cause other deleterious effects on various coating properties, e.g., producing a rough film surface.

U.S. Pat. No. 4,615,779 to McCollum, et al. issued Oct. 7, 1986 suggests the use of lower molecular weight alcohol blocking agents to reduce weight loss when the film is heated to cure. Such blocking agents, however, can produce undesirable film defects. U.S. Pat. No. 5,431,791 to December, et al. issued Jul. 11, 1995 describes the use of a curing agent having a plurality of cyclic carbonate groups, in place of blocked polyisocyanates, which still provides desirable urethane crosslinks but is able to avoid bake-off losses and other problems that accompany the use of blocked polyisocyanate curing agents. Cyclic carbonates, however, are oftentimes difficult to incorporate into the principal emulsion.

Therefore, there is still a need to find new cross-linking agents for cathodic electrocoating compositions that reduce volatile emissions and bake-off losses, while maintaining the desired coating properties.

SUMMARY OF THE INVENTION

The invention is directed to an improved aqueous cathodic electrocoating composition having a film forming binder of an epoxy-amine adduct, a crosslinking agent for the epoxy-amine adduct and an organic or inorganic acid as the neutralizing agent for the epoxy-amine adduct; wherein the improvement is the use of a crosslinking agent having, on an average basis, at least two morpholine dione groups per molecule, that are capable of reacting with the amine groups on the epoxy-amine adduct. An additional crosslinking agent is also preferably used to provide a highly crosslinked final film network.

The invention is based on the discovery that the crosslinking reaction between morpholine dione groups with amine groups occurs at relatively low temperature and no volatile by-products are released. Thus, it has now been found that bake-off loss on cure can be significantly reduced and the problems that accompany the use of blocked polyisocyanate curing agents can be greatly avoided.

Methods for cathodically electrocoating a conductive substrate using any of the above-described compositions and conductive articles coated therewith also form part of this invention.

DETAILED DESCRIPTION OF THE INVENTION

The electrocoating composition of this invention is an aqueous composition preferably having a solids content of about 5–50% by weight of a principal emulsion of a cathodic film forming binder, additives, pigment dispersant resins, pigments and the like and usually contains an organic coalescing solvent.

The film forming binder of the principal emulsion used to form the cathodic electrocoating composition of this invention is an epoxy-amine adduct and a novel morpholine dione group containing crosslinking agent. The epoxy-amine adduct is usually formed from an epoxy resin which preferably is chain extended and then reacted with an amine to provide an adduct with amine groups that are subsequently neutralized with an acid. The epoxy-amine adduct usually is blended with the crosslinking resin and then neutralized with an acid and inverted into water to form an aqueous emulsion, which is referred to as the principal emulsion. Other ingredients are then added to the principal emulsion, such as pigment in the form of a pigment paste, coalescent solvents, anticrater agent, flexibilizers, defoamers, wetting agents, and other additives, such as catalyst, to form a commercial electrocoating composition. Typical aqueous cathodic electrocoating compositions are shown in DeBroy, et al. U.S. Pat. No. 5,070,149 issued Dec. 3, 1991 and the aforementioned U.S. Pat. Nos. 3,922,253; 4,419,467; 4,137,140 and 4,468,307.

The advantage of the electrocoating composition of this invention formulated with the novel morpholine dione crosslinking agent is that there is reduced volatile emission and reduced bake-off loss, and attendant weight loss, occurring from the film during cure after electrodeposition. In addition, the electrocoating composition exhibits lower curing temperature, better edge corrosion resistance and smoother appearance in comparison to electrocoating compositions that only contain conventional alcohol-blocked polyisocyanate crosslinking agents.

The epoxy-amine adduct of the novel composition is formed of an epoxy resin which preferably is chain extended and then reacted with an amine. The resulting epoxy-amine adduct has reactive hydroxyl, epoxy and amine groups.

The epoxy resin used in the epoxy amine adduct is a poly epoxy-hydroxy-ether resin having an epoxy equivalent weight of about 150–2,000.

Epoxy equivalent weight is the weight of resin in grams which contain one gram equivalent of epoxy.

These epoxy resins can be any epoxy-hydroxy containing polymer having a 1,2-epoxy (i.e., terminal) equivalency of two or more per molecule, that is, a polyepoxide which has on an average basis two or more epoxy groups per molecule. Preferred are polyglycidyl ethers of cyclic polyols. Particularly preferred are polyglycidyl ethers of polyhydric phenols such as bisphenol A. These polyepoxides can be produced by etherification of polyhydric phenols with epihalohydrin or dihalohydrin such as epichlorohydrin or dichlorohydrin in the presence of alkali. Examples of polyhydric phenols are 2,2-bis-(4-hydroxyphenyl)ethane, 2-methyl-1,1-bis-(4-hydroxyphenyl)propane, 2,2-bis-(4-hydroxy-3-tertiarybutylphenyl)propane, 1,1-bis-(4-hydroxyphenol) ethane, bis-(2-hydroxynaphthyl)methane, 1,5-dihydroxy-3-naphthalene or the like.

Besides polyhydric phenols, other cyclic polyols can be used in preparing the polyglycidyl ethers of cyclic polyol derivatives. Examples of other cyclic polyols are alicyclic polyols, particularly cycloaliphatic polyols, such as 1,2-bis (hydroxymethyl)cyclohexane, 1,3-bis-(hydroxymethyl) cyclohexane, 1,2-cyclohexane diol, 1,4-cyclohexane diol and hydrogenated bisphenol A.

The epoxy resin can be chain extended, for example, with any of the aforementioned polyhydric phenols. Preferred chain extenders are bisphenol A and ethoxylated bisphenol A and preferably a combination of these phenols. Also, the polyepoxides can be chain extended with a polyether or a polyester polyol which enhances flow and coalescence. Typical useful chain extenders are polyols such as polycaprolactone diols, such as Tone 200® series available from Union Carbide/Dow Corporation, and ethoxylated bisphenol A, such as SYNFAC 8009® available from Milliken Chemical Company.

Examples of polyether polyols and conditions for chain extension are disclosed in U.S. Pat. No. 4,468,307. Examples of polyester polyols for chain extension are disclosed in Marchetti et al U.S. Pat. No. 4,148,772 issued Apr. 10, 1979.

Typical catalysts that are used in the formation of these polyepoxy hydroxy ether resins are tertiary amines such as dimethylbenzylamine and organometallic complexes such as ethyl or other alkyl triphenyl phosphonium iodide.

Ketimines and/or secondary amines and/or primary amines can be used to cap, i.e., react with the epoxy end groups of the resin to form the epoxy amine adduct. Ketimines, which are latent primary amines, are formed by reacting ketones with primary amines. Water formed in the reaction is removed, for example, by azeotropic distillation. Useful ketones include dialkyl, diaryl, and alkylaryl ketones having 3–13 carbon atoms. Specific examples of ketones used to form these ketimines include acetone, methyl ethyl ketone, methyl n-butyl ketone, methyl isobutyl ketone, methyl isoamyl ketone, methyl aryl ketone, ethyl isoamyl ketone, ethyl amyl ketone, acetophenone, and benzophenone. Suitable diamines are ethylenediamine, 1,3-diaminopropane, 1,4-diaminobutane, 1,6-diaminohexane, 4,9-dioxododecane and 1,12-dodecanediamine and the like. One typically useful ketimine is diketimine which is the ketimine of diethylene triamine and methyl isobutyl ketone.

Typically useful primary and secondary amines that can be used to form the epoxy-amine adduct are methylamine, ethylamine, propylamine, butylamine, isobutylamine, benzylamine and the like; and dimethylamine, diethylamine, dipropylamine, diisopropylamine, dibutylamine and the like. Alkanol amines are preferred, such as ethanolamine, propanolamine, and the like; and methylethanolamine, ethylethanolamine, phenylethanolamine, diethanolamine and the like. Other amines that can be used are set forth in the aforementioned U.S. Pat. No. 4,419,467 which is hereby incorporated by reference.

It has been discovered that amine groups react with the morpholine dione crosslinking groups employed in this invention.

The cathodic binder of the electrocoating composition contains about 20–80% by weight of the forgoing epoxy amine adduct and correspondingly 80–20% of the morpholine dione crosslinking agent.

The coating composition of the present invention, as previously indicated, includes a novel curing agent that has on an average basis at least one, preferably at least two, morpholine dione groups per molecule. As will be understood by those skilled in the art, if only one morpholine dione group is present, the crosslinking agent will contain at least one other crosslinkable group, such as but not limited to a melamine or isocyanate group (blocked or unblocked), to enable the film to cure. During curing, it is believed that the morpholine dione groups, i.e., the crosslinking functionality, react with amine functional groups in the electrocoat resin to form a crosslinking network during cure. The reaction between morpholine dione groups with amine functional groups occurs at relatively low temperatures and no volatile by-products are released, since a ring-opening reaction is involved. Accordingly, this type of curing mechanism reduces bake-off loss and does not contribute to weight loss when the film is heated to cure. Also, this curing mechanism has been found to be stable to active hydrogens at room temperature but reactive with active hydrogen at only slightly elevated temperatures, such as between 275° and 325° F. (135°–162.5° C.).

More particularly, the novel morpholine dione compound used in this invention is formed of an epoxy resin which is reacted with an amine to provide an adduct with amine groups that are subsequently reacted with an oxalate to convert the epoxy groups to morpholine dione groups. Accordingly, the resulting compound has reactive morpholine dione groups.

The epoxy resin used in preparing the morpholine dione compound is a polyepoxy resin having an epoxy equivalent weight of about 150–2,000, and any of the epoxy resins listed above for use in the epoxy-amine adduct may also be used in the morpholine dione crosslinking agent.

As indicated above, these epoxy resins can be any epoxy-hydroxy containing polymer having a 1,2-epoxy equivalency of two or more per molecule, that is, a polyepoxide which has on an average basis two or more epoxy groups per molecule. The preferred are polyglycidyl ethers of cyclic polyols. Particularly preferred are polyglycidyl ethers of polyhydric phenols such as bisphenol A. These polyepoxides can be produced by etherification of polyhydric phenols with epihalohydrin or dihalohydrin such as epichlorohydrin or dichlorohydrin in the presence of alkali. Examples of polyhydric phenols are 2,2-bis-(4-hydroxyphenyl)ethane, 2-methyl-1,1-bis-(4-hydroxyphenyl)propane, 2,2-bis-(4-hydroxy-3-tertiarybutylphenyl)propane, 1,1-bis-(4-hydroxyphenol) ethane, bis-(2-hydroxynaphthyl)methane, 1,5-dihydroxy-3-naphthalene or the like.

Besides polyhydric phenols, other cyclic polyols can be used in preparing the polyglycidyl ethers of cyclic polyol derivatives. Examples of other cyclic polyols are alicyclic polyols, particularly cycloaliphatic polyols, such as 1,2-bis(hydroxymethyl)cyclohexane, 1,3-bis-(hydroxymethyl) cyclohexane, 1,2-cyclohexane diol, 1,4-cyclohexane diol and hydrogenated bisphenol A.

Oligomeric or polymeric polyepoxides, such as acrylic polymers or oligomers containing glycidyl methacrylate or epoxy-terminated polyglycidyl ethers, can also be used. Monomers commonly used in preparing acrylic polymers are styrene, methyl methacrylate, butyl acrylate, butyl methacrylate, ethyl hexyl methacrylate, glycidyl acrylate, and glycidyl methacrylate, and the like. The acrylic polymer, however, should not contain any hydroxy functional monomers, such as hydroxy alkyl acrylates and methacrylates, since the hydroxyl alcohol groups can interfere with the morpholine dione group formation reaction. Other polyepoxide resins, such as epoxy-novolacs, particularly epoxy cresol and epoxy phenol novolacs, can also be used in the present invention to form the principal emulsion. Epoxy novolacs are typically produced by reacting a novolac resin, usually formed by the reaction of orthocresol or phenol and formaldehyde, with epichlorohydrin. As with any of the polyepoxides, epoxy-novolacs can be reacted with alkyl amine and dialkyl oxalate to form the morpholine dione crosslinking agent.

The amines which are used in preparing the morpholine dione are preferably primary amines. The primary amines react with the epoxy groups of the resin to form amino alcohol groups thereon which are capable of forming a morpholine dione structure. Useful primary amines include any of those listed above used to form the epoxy-amine adduct. Particularly preferred are alkyl amines having 1–15 carbon atoms in the alkyl group. Most preferred are sterically hindered primary amines such as t-butyl amine. Hindered amines prevent dimerization of the epoxide and favor the desired epoxy ring opening reaction.

The resulting adduct can then be reacted with any conventional oxalate ester to ring close and form the crosslinkable morpholine dione groups thereon. Alcohol formed in the reaction is removed, for example, by azeotropic distillation. Useful oxalates in forming the morpholine dione compounds include dialkyl oxalates having 1 to 15 carbon atoms in the alkyl groups, of which diethyl oxalate is most preferred.

Preferably the number average molecular weight of the morpholine dione compound used in this invention is less than about 2,000, more preferably less than about 1,500, in order to achieve high flowability and high film smoothness. A preferred range for the number average molecular weight is between 400 and 1,200. All molecular weights disclosed herein are determined by gel permeation chromatography using a polystyrene standard. Preferably, these compounds are activated (i.e., ring-opened) during aminolysis reactions at much lower baking temperatures than standard blocked polyisocyanates, preferably between 275° and 325° F. (135°–162.5° C.). By comparison, standard blocked polyisocyanate are baked nowadays at 330° F. (165.5° C.) or above to unblock the isocyanate and begin the curing reaction.

One preferred class of morpholine dione compounds useful as the crosslinking agent in the present invention is the reaction product of an aromatic polyepoxy-hydroxy-ether resin, such as a polyglycidyl ether of bisphenol A, with alkyl amine and dialkyl oxalate. Examples of useful compounds within this class are represented by the formula:

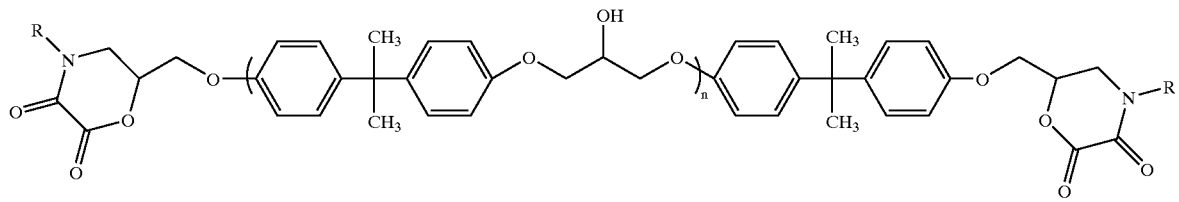

where R is independently an alkyl group having 1–10, preferably 2–6 carbon atoms, and n is 0 or a positive integer from 1–4.

Another preferred class of morpholine dione compounds useful in the present invention is the reaction product of an epoxy novolac resin, such as epoxy phenol novolac, with alkyl amine and dialkyl oxalate. Examples of useful compounds within this class are represented by the formula:

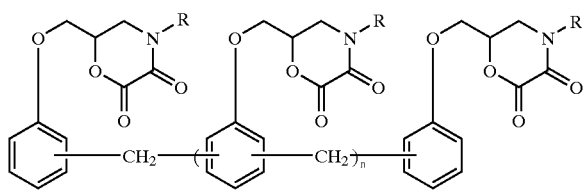

where R is independently an alkyl group having 1–8, preferably 2–6 carbon atoms, and n is 0 or a positive integer from 1–4.

The novel morpholine dione compounds used in the coating composition can be prepared by any of several different approaches. The preferred process for preparing morpholine dione compounds from epoxy resins is a stepwise process which involves slowly charging the epoxy resin to a reaction vessel containing primary amine and keeping the reaction temperature at −10° C. to 100° C., preferably at 10° C. to 40° C., until all of the epoxy groups are reacted as indicated by infrared scan. Preferably, the molar ratio of epoxy to amine groups in the above reaction is in the range of 1:1 to 1:10, more preferably 1:1, although there are many reasons to vary from this range, as will be appreciated by those skilled in the art. The reaction is preferably carried in the presence of a polar solvent such as ethanol for reducing viscosity in the reaction vessel. Excess amine is preferably removed before the addition of dialkyl oxalate. Then, dialkyl oxalate and appropriate catalyst, such as 4-dimethylaminopyridine, are charged to the reaction vessel and the reaction vessel is generally maintained at the reflux temperature until all the epoxy-amino groups are ring closed and converted to morpholine dione groups as indicated by infrared scan. Preferably, the molar ratio of amine groups to oxalate groups in the above reaction is in the range of 0.8:1 to 1:0.8, more preferably 1:1. Alcohol formed in this reaction is removed, for example, by azeotropic distillation.

Typical catalysts that can be used in the formation process are tertiary amines and most especially 4-dimethylaminopyridine.

Typical solvents that can be used in the formation process are ketones such as methyl amyl ketone, methyl isobutyl ketone, methyl ethyl ketone, aromatic hydrocarbons such as toluene, xylene, alkylene carbonates such as propylene carbonate, n-methyl pyrrolidone, ethers, esters, acetates and mixture of any of the above, although polar solvents such as ethanol and the like are generally preferred.

As indicated above, the reaction conditions are preferably chosen so that 100% of the epoxy groups are reacted and converted to morpholine dione groups, or as close to 100% as can be reasonably achieved, leaving essentially no unreacted epoxy groups in the molecule.

The resulting morpholine dione compounds are used in the present coating composition in an amount varying from about 10–60%, preferably about 15–40%, by weight of the total binder in the composition. Most preferably, about 20–30% by weight of such a morpholine dione compound is included in the binder.

Besides the morpholine dione compounds derived from epoxy resins as described above, other morpholine dione compounds can also be used in the present invention, as will be appreciated by those skilled in the art.

Optionally, the present coating composition may further, and preferably does, include an additional crosslinking agent, in conjunction with the morpholine dione crosslinking agent. The additional crosslinking agent may comprise 0 to 99% by weight of the total crosslinking component used in the present coating composition. The additional crosslinking agent is used to react with any remaining active hydrogen groups present in the resin system. Examples of additional crosslinking agents include any of the conventionally known blocked polyisocyanate crosslinking agents. These are aliphatic, cycloaliphatic and aromatic isocyanates such as hexamethylene diisocyanate, cyclohexamethylene diisocyanate, toluene diisocyanate, methylene diphenyl diisocyanate and the like. Aromatic diisocyanates such as methylene diphenyl diisocyanate are preferred. These isocyanates are pre-reacted with a blocking agent such as oximes, alcohols, or caprolactams which block the isocyanate functionality. One preferred mixture of blocking agents is methanol, ethanol and diethylene glycol monobutyl ether. Upon heating, the blocking agents separate, thereby providing a reactive isocyanate group and additional crosslinking occurs with the epoxy-amine adduct. Isocyanate crosslinkers and blocking agents are well known in the art and also are disclosed in Marchetti et al U.S. Pat. No. 4,419,467 issued Apr. 10, 1979, hereby incorporated by reference. Melamine crosslinking agents could also be used.

The cathodic binder of the epoxy amine adduct and the crosslinking agent(s) are the principal resinous ingredients in the electrocoating composition and are usually present in amounts of about 30 to 50% by weight of solids of the composition. The basic groups (amine groups) of the cathodic binder are partially or totally neutralized with an acid to form a water soluble product. Typical acids used to neutralize the epoxy-amine adduct to form water-dispersible cationic groups are lactic acid, acetic acid, formic acid, sulfamic acid, alkane sulfonic acids such as methane sulfonic acids, ethane sulfonic acid, propane sulfonic acid and the like. Alkane sulfonic acids are generally preferred. The degree of neutralization depends upon the properties of the binder employed in each individual case. In general, sufficient acid is added to provide the resulting electrocoating composition with a pH of about 5.5–8.0. To form an electrocoating bath, the solids of the electrocoating composition are generally reduced with an aqueous medium to the desired bath solids.

Besides the binder resin ingredients described above, the electrocoating composition usually contains pigment which is incorporated into the composition in the form of a pigment paste. The pigment paste is prepared by grinding or dispersing a pigment into a grinding vehicle with curing catalyst and other optional ingredients such as anticratering agents wetting agents, surfactants, and defoamers. Any of the pigment grinding vehicles that are well known in the art can be used. Typically, grinding is done using conventional equipment known in the art such as an Eiger mill, Dynomill or sand mill. Generally grinding is carried out for about 2 to 3 hours until a minimum of 7 or greater Hegman reading is obtained.

Viscosity of the pigment dispersion before it is ground or milled is important. B Brookfield viscosity typically is used as determined in accordance with ASTM D-2196. While the desired viscosity will vary with the selected components, viscosity generally will be in the range of 8000 centipoise to 1500 centipoise (0.8 Pa.s to 1.5 Pa.s) to achieve a fine grind during grinding. Viscosity typically increases during grinding and is readily adjusted by modifying the amount of water present.

Pigments which can be used in this invention include titanium dioxide, basic lead silicate, strontium chromate, carbon black, iron oxide, clay and the like. Pigments with high surface areas and oil absorbencies should be used judiciously because these can have an undesirable affect on coalescence and flow of the electrodeposited coating.

The pigment to binder weight ratio is also important and should be preferably less than 5:1, more preferably less than 4:1, and usually about 2 to 4:1. Higher pigment to binder weight ratios have been found to adversely affect coalescence and flow.

The electrocoating compositions of the invention can contain optional ingredients such as wetting agents, surfactants, defoamers and the like. Examples of surfactants and wetting agents include alkyl imidazolines such as those available from Ciba-Geigy Industrial Chemicals as Amine C®, acetylenic alcohols available from Air Products and Chemicals as Surfynol 104®. These optional ingredients, when present, constitute from about 0.1 to 20 percent by weight of binder solids of the composition.

Optionally, plasticizers can be used to promote flow. Examples of useful plasticizers are high boiling water immiscible materials such as ethylene or propylene oxide adducts of nonyl phenols or bisphenol A. Plasticizers are usually used at levels of about 0.1 to 15 percent by weight resin solids.

Curing catalysts such as tin are usually present in the composition. Examples are dibutyltin dilaurate and dibutyltin oxide. When used, they are typically present in amounts of about 0.05 to 2 percent by weight tin based on the weight of total resin solids.

The electrocoating compositions of this invention are dispersed in an aqueous medium. The term "dispersion" as used within the context of this invention is believed to be a two-phase translucent or opaque aqueous resinous binder system in which the binder is in the dispersed phase and water the continuous phase. The average particle size diameter of the binder phase is about 0.05 to 10 $\mu$m, preferably, less than 0.2 $\mu$m. The concentration of the binder in the aqueous medium in general is not critical, but ordinarily the major portion of the aqueous dispersion is water. The aqueous dispersion usually contains from about 3 to 50 percent, preferably 5 to 40 percent, by weight binder solids. Aqueous binder concentrates which are to be further diluted with water when added to an electrocoating bath, generally have a range of binder solids of 10 to 30 percent weight.

Besides water, the aqueous medium of the cathodic electrocoating composition contains a coalescing solvent. Useful coalescing solvents include hydrocarbons, alcohols, polyols, and ketones. Preferred coalescing solvents include monobutyl and monohexyl ethers of ethylene glycol and phenyl ether of propylene glycol. The amount of coalescing solvent is not critical but generally is between 0.1 to 15% by weight, preferably 0.5% by weight, based on the total weight of the aqueous medium.

The electrocoating composition of this invention is used in a conventional cathodic electrocoating process. The electrocoating tank contains two electrically conductive electrodes: the anode which is part of the electrocoating tank and the cathode which is the substrate that is to be coated. This substrate may be any electrically conductive (e.g., metal) object, including but not limited to items such as an auto body or auto part or any other OEM or industrially coated part, including but not limited to, yard equipment (e.g., lawn mowers, snow blowers, gardening and power tools, and parts therefore), office furniture, household appliances, children's toys, and the like. An adherent film is deposited on the cathode when a sufficient voltage is impressed between the two electrodes. The voltages that are applied may be varied depending on the type of coating and on coating thickness and throw power required and may be as low as 1 volt or as high as several thousand volts. Typical voltages used are between 50–500 volts. The current density usually is between 0.5 and 5 amperes per square foot (4.65 and 46.5 amperes per square meter), and decreases during electrodeposition indicating that an insulating film is being deposited. The immersion time should be sufficient to obtain a cured coating of about 0.5–1.5 mils (10–40 $\mu$m), preferably 0.8–1.2 mils (20–30 $\mu$m). A variety of substrates can be electrocoated with the composition of this invention, such as steel, phosphatized steel, galvanized steel, copper, aluminum, magnesium, and various plastics coated with an electrically conductive coating.

After the coating has been electrocoated, it is cured by baking at elevated temperatures such as 135–200° C. for a sufficient time to cure the coating, typically about 5 to 30 minutes.

In the present invention, the curing reaction is a ring-opening reaction involving the aminolysis of morpholine diones, and releases no volatile by-products. The aminolysis reaction of morpholine diones may be described as an amide forming reaction, which still provides desirable amide crosslinks but is able to avoid significant bake-off losses. Upon curing, the hydroxy groups may further react with the additional crosslinker, if present, to produce a highly crosslinked network.

The following Examples illustrate the invention. All parts and percentages are on a weight basis unless otherwise indicated. All molecular weights disclosed herein are determined by GPC using a polystyrene standard. Unless otherwise specified, all chemicals and reagents were used as received from Aldrich Chemical Co., Milwaukee, Wis.

EXAMPLES

The following morpholine dione crosslinking resin solution was prepared, along with a conventional blocked polyisocyanate crosslinking resin solution, and then principal emulsions and electrocoating compositions were prepared therefrom and the properties of these compositions were compared.

Example 1
Preparation of Morpholine Dione Crosslinking Resin Solution

Di-((4-butyl-2,3-dioxomorpholin-6-yl)-methyl) ether of bisphenol A was prepared by charging about 2537 parts butylamine into a suitable reaction vessel and kept it at 0° C. under nitrogen blanket. A mixture of about 1269 parts Epon® 828 (epoxy resin of diglycidyl ether of bisphenol A, having an equivalent weight of 188, from Shell) and 805 parts ethanol was slowly charged into the reaction vessel and kept the reaction temperature at 0° C. for 2 hours. The reaction temperature was slowly increased to 10° C.–15° C. for 6 hours and finally to 25° C. and held it at 25° C. until all epoxy groups were reacted as indicated by IR scan. The excess of butylamine and ethanol were removed by using rotary evaporator. About 805 parts ethanol, 1.2 parts 4-dimethylaminopyridine and 880 parts diethyl oxalate were added into the reaction vessel and the reaction mixture was refluxed for 2 hours under a nitrogen blanket. The excess ethanol was removed at atmospheric pressure by distillation through a Vigreux column and the ethanol produced upon ring closure was removed by heating the reaction mixture to 160° C. with a vacuum pump. The resulting resin was a brittle and colorless solid.

Example 2
Preparation of Conventional Crosslinking Resin Solution

A mixed alcohol blocked polyisocyanate crosslinking resin solution was prepared by charging about 336.86 parts Mondur® MR (methylene diphenyl diisocyanate, from Bayer), 112.29 parts methyl isobutyl ketone and 0.07 parts dibutyl tin dilaurate into a suitable reaction vessel and heated to 82° C. under a nitrogen blanket. About 229.68 parts propylene glycol mono methyl ether was slowly charged into the reaction vessel while maintaining the reaction mixture below 93° C. The reaction mixture was then held at 110° C. until essentially all of the isocyanate was reacted as indicated by infrared scan. About 3.46 parts butanol and 73.13 parts methyl isobutyl ketone were then added. The resulting resin solution had a nonvolatile content of 75%.

Example 3
Preparation of Chain Extended Polyepoxide Principal Emulsion with Di-((4-butyl-2,3-dioxomorpholin-6-yl)-methyl) Ether of Bisphenol A and Conventional Crosslinker The following ingredients were charged into a suitable reaction vessel: about 520 parts Epon®828 (Epoxy resin of diglycidyl ether of bisphenol A having an epoxy equivalent weight of 188, from Shell), 151 parts bisphenol A, 190 parts ethoxylated bisphenol A having a hydroxyl equivalent weight of 247 (Synfac® 8009, from Milliken), 44 parts xylene and 0.5 part dimethylbenzylamine. The resulting reaction mixture was heated to 160° C. under nitrogen blanket and held at this temperature for one hour. 1 part dimethylbenzylamine were added and the mixture was held at 147° C. until an epoxy equivalent weight of 1050 was obtained. The reaction mixture was cooled to 149° C. and then 996 parts alcohol blocked polyisocyanate resin (prepared in Example 2) and 596 Di-((4-butyl-2,3-dioxomorpholin-6-yl)-methyl) ether of bisphenol A resin (prepared in Example 1) were added. At 107° C., about 58 parts diketimine (reaction product of diethylenetriamine and methyl isobutyl ketone at 73% nonvolatile content) and 47 parts of methylethanolamine were added. The resulting mixture was held at 120° C. for one hour and then dispersed in an aqueous medium of 1500 parts deionized water and 81 parts methanesulfonic acid (70% methanesulfonic acid in deionized water). It was further diluted with 818 parts deionized water. The emulsion was kept agitated until methyl isobutyl ketone had evaporated. The resulting emulsion had a nonvolatile content of 38%.

Example 4
Preparation of Chain Extended Polyepoxide Principal Emulsion with Conventional Crosslinking Resin Solution The following ingredients were charged into a suitable reaction vessel: about 520 parts Epon®828 (Epoxy resin of diglycidyl ether of bisphenol A having an epoxy equivalent weight of 188, from Shell), 151 parts bisphenol A, 190 parts ethoxylated bisphenol A having a hydroxyl equivalent weight of 247 (Synfac® 8009, from Milliken), 44 parts xylene and 1 part dimethylbenzylamine. The resulting reaction mixture was heated to 160° C. under nitrogen blanket and held at this temperature for one hour. 2 parts dimethylbenzylamine were added and the mixture was held at 147° C. until an epoxy equivalent weight of 1050 was obtained. The reaction mixture was cooled to 149° C. and then about 797 parts conventional crosslinking resin (prepared in Example 2) was added. At 107° C., about 58 parts of diketimine (reaction product of diethylenetriamine and methyl isobutyl ketone at 73% nonvolatile content) and 48 parts of methylethanolamine were added. The resulting mixture was held at 120° C. for one hour and then dispersed in an aqueous medium of 1335 parts deionized water and about 81 parts methanesulfonic acid (70% methanesulfonic acid in deionized water). It was further diluted with 825 parts deionized water. The emulsion was kept agitated until methyl isobutyl ketone had evaporated. The resulting emulsion had a nonvolatile content of 38%.

Example 5

Preparation of Quaternizing Agent

The quaternizing agent was prepared by adding about 87 parts dimethylethanolamine to 320 parts 2-ethyl hexanol half-capped toluene diisocyanate in the reaction vessel at room temperature. An exothermic reaction occurred and the reaction mixture was stirred for one hour at 80° C. About 118 parts aqueous lactic acid solution (75% nonvolatile content) was then added followed by the addition of 39 parts 2-butoxyethanol. The reaction mixture was held for about one hour at 65° C. with constant stirring to form the quaternizing agent.

Example 6

Preparation of Pigment Grinding Vehicle

The pigment grinding vehicle was prepared by charging about 710 parts Epon®828 (Diglycidyl ether of bisphenol A having an epoxide equivalent weight of 188, from Shell) and 290 parts bisphenol A into a suitable vessel under nitrogen blanket and heated to 150° C.–160° C. to initiate an exothermic reaction. The exothermic reaction was continued for about one hour at 150° C.–160° C. The reaction mixture was then cooled to 120° C. and about 496 parts of 2-ethyl hexanol half-capped toluene diisocyanate was added. The temperature of the reaction mixture was held at 110° C.–120° C. for one hour, followed by the addition of about 1095 parts of 2-butoxyethanol, the reaction mixture was then cooled to 85° C.–90° C. and then 71 parts of deionized water was added followed by the addition of about 496 parts quaternizing agent (prepared in Example 5). The temperature of the reaction mixture was held at 85° C.–90° C. until an acid value of about 1 was obtained.

Example 7

| Preparation of pigment paste | |
|---|---|
| | Parts by Weight |
| Pigment grinding vehicle (prepared in Example 6) | 597.29 |
| Deionized water | 1140.97 |
| Titanium dioxide pigment | 835.66 |
| Aluminum silicate pigment | 246.81 |
| Carbon black pigment | 15.27 |
| Dibutyl tin oxide | 164.00 |
| Total | 3000.00 |

The above ingredients were mixed until homogeneous mixture was formed in a suitable mixing container. Then was dispersed by charging into Eiger mill and then grinding until it pass the Hegman test.

Example 8

| Preparation of Electrocoating Baths I and II | | |
|---|---|---|
| | Parts by weight | |
| According to: | Bath I Invention | Bath II Prior Art |
| Emulsion (prepared in Example 3) | 1503.08 | — |
| Emulsion (prepared in Example 4) | — | 1503.08 |
| Deionized water | 2013.49 | 2013.49 |
| Pigment paste (prepared in Example 7) | 397.54 | 397.54 |
| Conventional anti crater agent* | 85.89 | 85.89 |
| Total | 4000.00 | 4000.00 |

*Conventional anti-crater agent is the reaction product of Jeffamine ® D2000 from Huntsman and Epon ® 1001 epoxy resin from Shell.

Cationic electrocoating baths I and II were prepared by mixing the above ingredients. Each bath was then ultrafiltered. Phosphated cold rolled steel panels were electrocoated in each bath at 240–280 volts to obtain a film 0.8–1.0 mils (20.32–25.4 µm) thick on each panel. The electrocoated panels were then baked at 360° F. metal temperature for 10 minutes. For solvent resistance test, the electrocoated panels were instead baked at 330° F. metal temperature for 10 minutes.

The above prepared steel panels were tested for solvent resistance by a standard rub test (20 double rubs with a methyl ethyl ketone soaked rag) and for bake-off loss.

One method used for checking the proper cure of an e-coat film at specified baking temperature is the solvent resistance test which involves rubbing a cloth soaked in methyl ethyl ketone onto an e-coat film using a minimum of 20 rubs back and forth. The degree of cure can be assessed by examining the cloth for discoloration and by examining the surface of the film for a dull appearance. Dull appearance on an e-coat film or discoloration on the cloth indicates poor cure of e-coat film.

In the above example, phosphated cold rolled steel panels coated with bath I baking at 330° F. for 10 minutes metal temperature showed no dull appearance, which indicates a complete cure. On the other hand, phosphated cold rolled steel panels coated with bath II baking at the same temperature showed a significant amount of dull appearance or incomplete cure.

Another key factor of evaluating e-coat film is the bake-off loss during baking. To determine the percentage bake-off loss during baking, the first step is to deposit the e-coat film on pre-weighed metal panels, the residual water is removed by heating the panels at 105° C. for 3 hours and finally the panels are baked at the specified time and temperature. The percentage bake-off loss of e-coat film is determined by the difference of the weight of e-coat before and after baking divided by the initial weight.

For bath I, the percentage bake-off loss at 360° F. for 10 minutes metal temperature is 8%–9% and for bath II, the percentage bake-off loss at 360° F. for 10 minutes metal temperature is 12%–13%.

The results of these tests are summarized below:

| Results | Bath I | Bath II |
|---|---|---|
| Solvent Resistance at 330° F. 10 Min. | No Rub Off (Good Cure) | Dull Appearance (Poor Cure) |
| Bake Off Loss at 360° F. 10 Min.* | 8–9% | 12–13% |

The above results show that Bath I containing the morpholine dione crosslinking agent had superior crosslinking at lower temperature and lower bake off loss that Bath II containing conventional crosslinking agents.

What is claimed is:

1. A cathodic electrocoating composition comprising, in an aqueous medium:
    A) a crosslinkable resin having at least one acid-neutralized amine group, and
    B) a crosslinking agent for said resin having at least one morpholine dione group.

2. The cathodic electrocoating composition of claim 1, further comprising:

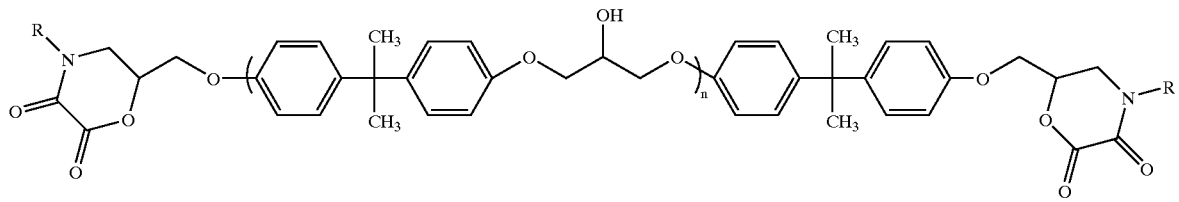

C) an auxiliary crosslinking agent that is capable of reacting with amine groups on said resin.

3. The cathodic electrocoating composition of claim 1, wherein
    said crosslinking agent B) has a plurality of morpholine dione groups.

4. A cathodic electrocoating method comprising:
    1) immersing a conductive substrate in a coating composition comprising, in aqueous medium:
        A) a crosslinkable resin having at least one acid-neutralized amine groups, and
        B) a crosslinking agent having at least one morpholine dione group,
    2) applying a potential of electric current between an anode and the conductive substrate, and
    3) removing the substrate from the coating composition.

5. The method of claim 4, wherein in step 1),
    said crosslinkable resin A) contains a plurality of acid-neutralized amine groups, and
    said crosslinking agent B) contains a plurality of morpholine dione groups.

6. An improved aqueous cathodic electrocoating composition comprising a binder of an epoxy-amine adduct, a crosslinking agent and an organic or inorganic acid as the neutralizing agent for the epoxy-amine adduct; wherein the improvement is the incorporation of a crosslinking agent that has at least one morpholine dione group per molecule.

7. The improved electrocoating composition of claim 6 in which said crosslinking agent has a plurality of morpholine dione groups per molecule.

8. The improved electrocoating composition of claim 7 in which the morpholine dione crosslinking agent is the reaction product of a polyepoxide with alkyl amine and dialkyl oxalate.

9. The improved electrocoating composition of claim 8 in which the morpholine dione crosslinking agent has the structural formula:

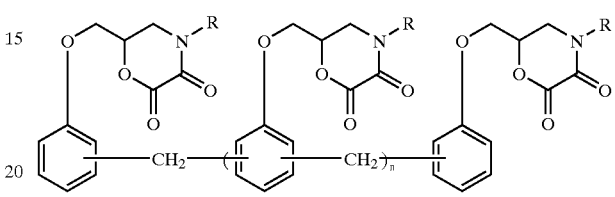

wherein n is 0 or a positive integer from 1–4 and R is an alkyl group having 1–8 carbon atoms.

10. The improved electrocoating composition of claim 8 in which the morpholine dione crosslinking agent has the structural formula:

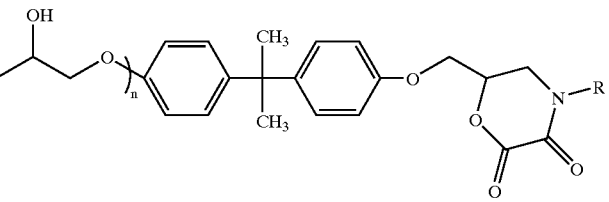

wherein n is 0 or a positive integer from 1–4 and R is an alkyl group having 1–10 carbon atoms.

11. The improved electrocoating composition of claim 7 in which the electrocoating composition further contains an additional crosslinking agent selected from a blocked polyisocyanate.

12. The improved electrocoating composition of claim 7 in which the epoxy-amine adduct contains amines selected from the group consisting of primary amines, secondary amines and ketimines and mixtures thereof.

13. The improved electrocoating composition of claim 7 in which the epoxy adduct comprises a polyepoxy hydroxy ether resin extended with a dihydric phenol and reacted with an amine and is neutralized with an organic or inorganic acid.

14. An improved method of preparing a cathodic electrocoating composition comprising the following steps in any workable order:
    1) preparing an epoxy amine adduct of an epoxy resin extended with a dihydric phenol and reacted with an amine;
    2) preparing a crosslinking agent for said epoxy amine adduct;

3) blending the epoxy amine adduct with the morpholine dione crosslinking agent;
4) neutralizing the epoxy amine adduct with an organic or inorganic acid to form an emulsion;
5) forming a pigment dispersion and blending the pigment dispersion with the neutralized emulsion;

wherein the improvement consists of using in step (2) a morpholine dione crosslinking agent of an epoxy resin reacted with an alkyl amine and then with a dialkyl oxalate.

* * * * *